United States Patent [19]
Schulz

[11] 3,794,363
[45] Feb. 26, 1974

[54] FLANGE

[76] Inventor: Wilhelm Schulz, Kuhleshuette 83, 415, Krefeld, Germany

[22] Filed: June 10, 1971

[21] Appl. No.: 151,771

[30] Foreign Application Priority Data
Dec. 3, 1970   Germany............................ 2059486

[52] U.S. Cl.................. 285/363, 285/368, 287/129
[51] Int. Cl............................................. F16l 19/00
[58] Field of Search... 285/363, 368, 405, 412, 416; 287/129

[56] References Cited
UNITED STATES PATENTS
1,855,494   4/1932   Sorensen......................... 285/368 X FOREIGN PATENTS OR APPLICATIONS
305,573   10/1968   Sweden............................... 285/363
63,526   7/1892   Germany ........................... 285/412
972,208   8/1950   France............................... 285/368
124,715   10/1901   Germany ........................... 285/368

*Primary Examiner*—Andrew V. Kundrat
*Attorney, Agent, or Firm*—Kenyon & Kenyon Reilly Carr & Chapin

[57] ABSTRACT

A pipe flange adapted to be welded to a section of pipe to effect a seal between two adjoining pipes. The flange includes an annular disc with an inner and outer wall depending therefrom to form an annular trough. The trough walls are deformed outwardly when a fastening bolt passing through the disc is tightened to compress the flange against an abutting member which may be an identical flange in oppositely facing relation. A sealing face extends from the inner wall parallel to the annular disc and is adapted to engage a seal or in one embodiment a pipe flange. A small pipe section may extend upwardly from the inner portion of the sealing face to permit welding the flange to one of the adjoining pipes.

5 Claims, 4 Drawing Figures

PATENTED FEB 26 1974 3,794,363

Inventor:
WILHELM SCHULZ
BY
Kenyon & Kenyon Reilly Carr & Chapin
ATTORNEYS

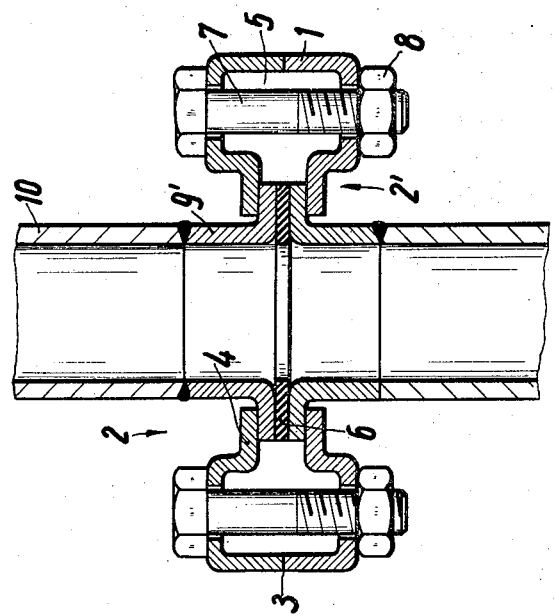
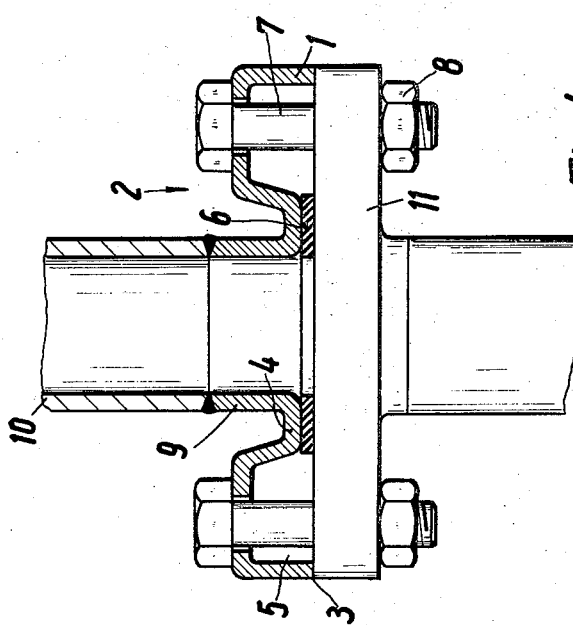

FLANGE

BACKGROUND OF THE INVENTION

This invention relates to a flange, and more particularly to a flange adapted to effect sealing between adjoining pipe sections.

Pipe sections are conventionally joined by means of flanged members bolted to one another. Such flanges have flat faces for forming the joint and include an interposed gasket or seal. When forced together by tightening the nuts on bolts passed through holes in the two flanges, sealing is achieved. The bending moments applied to the flanges when the bolts are pulled tight, necessitate flanges that are relatively thick for achieving the required strength and stability. By means disclosed herein, a flange is provided which is of a thickness substantially less than conventional and which results in more effective sealing.

SUMMARY OF THE INVENTION

Briefly stated, a flange is provided which is formed by an annular disc having apertures therethrough adapted to receive fastening bolts. An annular trough is formed by an inner and outer wall depending from the annular disc. The face of the lower free end of the outer wall is adapted to engage an abutting member, which might be an identical flange in oppositely facing relation, when the flange is compressed by tightening the bolt. An annular sealing face extends from the inner wall substantially parallel to the annular disc. As the flange is compressed against an abutting member, the sealing face may either directly engage a gasket-type seal or exert a compressive force thereon via an intermediate member such as a metallic flange.

The flange of this invention may be provided with a small pipe secton adapted to be welded to one of the adjoining pipes. This embodiment may be used by compressing one flange against a conventional type flange or, by compressing the flange of this invention against another identical one disposed in opposite facing relation. Still another embodiment of the flange of this invention may be used to exert a compressive clamping force against a pair of pipe flanges.

The flange of the present invention is formed by fabricating a metallic ring-shaped disc blank, preferable of stainless steel, of which the outer margin is bent over to extend towards and provide a face for abutting a co-operating flange. An inner annular ring area is depressed to form a sealing face, thereby creating an annular trough in the flange that will deform away from the co-operating flange in a zone having holes for the reception of fastening bolts.

In an embodiment of this invention, the inner periphery of the depressed ring area forming the sealing face is integrally formed with a short pipe extension.

Accordingly, it is a principal object of this invention to provide a flange for effective sealing of adjoining pipe sections.

It is another object of this invention to provide an effective sealing flange of relatively light weight.

These and other objects, advantages and features of the invention will become more apparent from the following description taken in conjunction with the accompanying drawings.

BRIEF DESCRIPTION OF THE DRAWINGS

FIG. 3 is a cross-sectional elevation view of a flange joint formed by clamp type flanges according to this invention; and FIG. 4 is a side elevation view, partly in cross-section, depicting the combination of an integral flange of the present invention with a conventional flange.

DESCRIPTION OF THE PREFERRED EMBODIMENT

Figure 2:
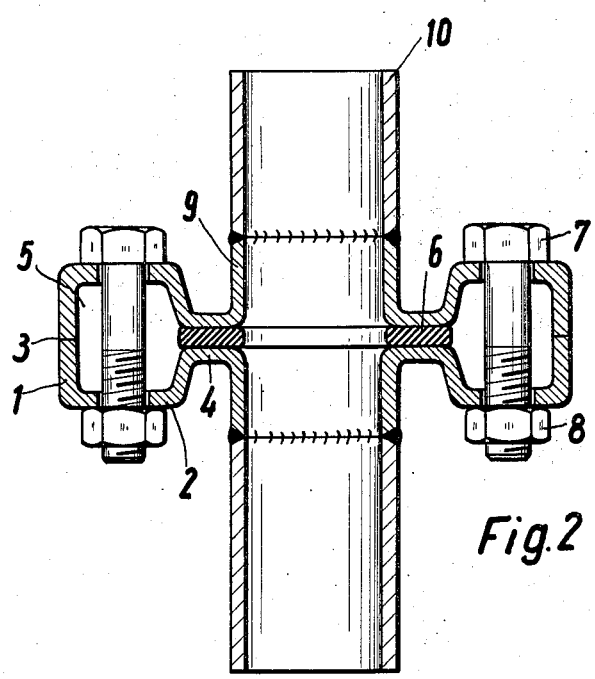
FIG. 2 is the embodiment according to FIG. 1 after the bolts have been tightened.

The flange of this invention is produced from a circular flat blank in which a center opening and the holes for the fixing bolts are formed by punching. The resultant ring is then formed in a press. The forming operation includes bending the outer marking 1 of the flange 2, so that it will extend towards a cooperating flange to create a butt face 3 and in depressing the inner ring area 4 to create a sealing face. This forming process results in the production of an annular trough 5 which bulges away from the cooperating flange 2 when the fixing bolts are tightened. When the flange coupling is pulled tight (FIG. 2), the two facing troughs 5 in the cooperating flanges form a completely closed receptacle which will receive the seal 6 interposed between the two flanges 2 should this be blown out by internal pressure. Hence, the provision of a protective wrapping which is necessarily placed about conventional flange joints for preventing the seal 6 from flying out, may be dispensed with. Moreover, the closed annular receptacle formed by the cooperating troughs provides a certain degree of protection against leakage.

When the flange joint 2 is tightened by fastening the nuts 8 on the bolts 7 (FIG. 2), the butt faces 3 of the external margins 1 of the flange first move into contact. The two flanges in this position mutually support each other around their peripheries. If the bolts 7 or nuts 8 continue to be tightened, the depressed sealing faces 4 will further compress the seal 6. Consequently, the screw pressure applied to the flange joint by the nuts is applied to the actual sealing faces. When conventional flange joints are pulled tight, the seal is conically compressed. By the improved flange construction, a greater degree of elasticity is inherent in the flange, thereby insuring that deformation of the flange caused by the tightening of the joint results in an increase in the pressure applied to the actual sealing faces, where this is desired. This fact and the trough-shaped configuration in the zone of the flanges 2, through which the fixing bolts 7 pass, improving the stability of the flanges, permit the latter to be of lighter weight construction, a major advantage by virtue of substantial saving in cost which can be achieved when the flanges consist of expensive material, such as stainless steel.

When the flange is designed as an integral member adapted to be welded to the pipe section, a short length of pipe 9 is integrally formed on the inner periphery of the ring area 4 of the sealing face. This short length of pipe 9 is connected to the pipe 10 by welding. After the holes for the bolts 7 have been punched into the circular blank, the flange 2 can be produced in a single operation in which the troughs 5 and the pipe extension 9 are formed in a press. The pipe extension 9 may also be formed during or after pressing with the aid of a deep drawing punch and die.

Figure 1:
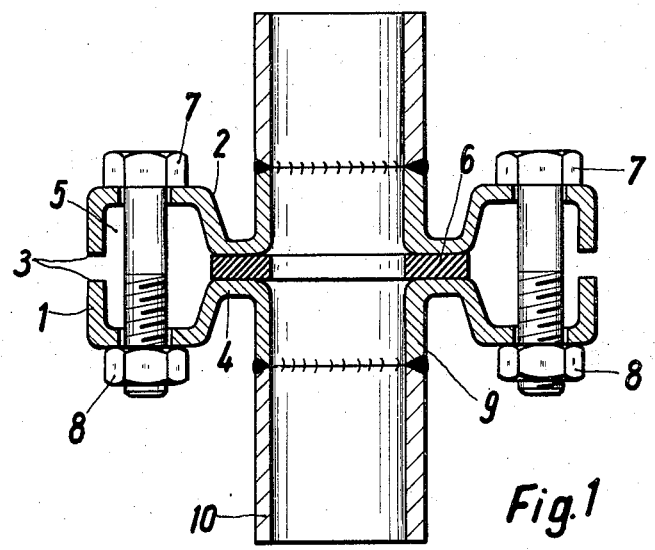
FIG. 1 is a cross-sectional elevation view of a flange joint formed by the integral flange of this invention, shown before the bolts are tightened.

FIG. 3 illustrates and alternate embodiment of the flange in the form of a clamp-type flange 2'. This embodiment differs from that of FIGS. 1 and 2, in that flange 2' lacks the integral pipe extension which in the arrangement illustrated in FIG. 3 is replaced by a separate flanged tube 9' welded to the end of the pipe 10. The flange 2' is formed in a manner similar to the flange 2 of FIGS. 1 and 2.

With reference to FIG. 4 it will be seen that an integral flange 2 according to the invention can also cooperate, in the same way as has been described, with a conventional flange 11. This also applies to the flange 2' of FIG. 3.

Common to both the flange 2 and 2' is the bent external margin 1 for forming a butt face 3 cooperating with the abutting flange, and the depressed or sunk inner ring area 4 which forms a sealing face. Firstly, this configuraiton creates the annular trough 5 where the fixing bolts 7 pass through the flange and thereby considerably increases the stability of the flange. Due to this improvement in stability by the geometrical configuration of the flange, the thickness of the flange 2 or 2' can be less than that of a conventional flange of the same stability and strength. This advantage is reflected in a saving of material. Secondly, and as already mentioned, the screw pressure is positively directed towards the sealing face of the flange joint. Other advantages, such as leakage protection and protection from blown out packings have already been mentioned.

Flanges having the above inventive features can be used both as integral flanges 2 and as clamp-type flanges 2'. Both flanges 2 or 2', are adapted to cooperate with any other flange, whether of like or different construction. The proposed metallic flanges may be made of stainless steel or a light metal alloy, such as aluminum alloy as well as various other materials.

Although the above description is directed to a preferred embodiment of the invention, it is noted that other variations and modifications will be apparent to those skilled in the art, and may be made without departing from the spirit and scope of the present disclosure.

What is claimed is:

1. A unitary flange member adapted to effect a seal between two adjoining pipe sections and which comprises a first annular disc having apertures therethrough adapted to receive fastening means, an annular outer wall extending perpendicularly from the outer periphery of said annular disc, said outer wall being of a predetermined axial length so that the face on the lower free end thereof is adapted to engage an abutting member when said flange member is compressed upon tightening of the fastening means, an annular inner wall havng one end thereof attached to and extending from the inner periphery of said annular disc, said annular inner wall being disposed parallel to said annular outer wall so as to form an annular trough between said walls, said predetermined axial length of said annular outer wall being greater than the axial length of said annular inner wall a second annular disc having a sealing face and extending from the other end of said annular inner wall radially inwardly away from said annular inner wall and substantially parallel to said first annular disc and spaced therefrom a predetermined distance so as to cooperate in effecting sealing between the two adjoining pipes when said flange member is compressed sufficiently to cause said face of said outer wall to engage an abutting member.

2. A flange member as defined in claim 1 which includes a small pipe section extending from the inner portion of said annular sealing face which is adapted to be welded to one of the pair of adjoining pipes.

3. A flange member as defined in claim 2 wherein sealing of adjoining pipes is effected by placing a pair of said flange members in oppositely facing relation with a compressible seal interposed between said annular sealing faces thereof so that upon tightening of said flange members against one another a sealing relationship exists.

4. A flange member as defined in claim 1 wherein sealing of adjoining pipes is effected by placing one of said flange members into abutting relation with the flat surface of a conventional flange, a seal being interposed between said annular sealing face and said conventional flange so that effective sealing is achieved when said lower face of said outer wall is compressed against the surface of said conventional flange.

5. A flange member as defined in claim 1 wherein sealing of adjoining pipes is effected by placing a pair of said flange members in oppositely facing relation with the annular sealing faces thereof engaging the surfaces of pipe flanges having a seal interposed between the latter so that upon tightening of said flange members against one another a sufficient compressive force is exerted upon said pipe flanges to cause a sealing relation to exist.

* * * * *

UNITED STATES PATENT OFFICE
CERTIFICATE OF CORRECTION

Patent No. 3,794,363          Dated 2/26/1974

Inventor(s) WILHELM SCHULZ

It is certified that error appears in the above-identified patent and that said Letters Patent are hereby corrected as shown below:

In column 1, line 36, change "secton" to --section--

In column 4, line 32 (claim 4), change "defined in claim 1" to --defined in claim 2--

Signed and sealed this 9th day of July 1974.

(SEAL)
Attest:

McCOY M. GIBSON, JR.
Attesting Officer

C. MARSHALL DANN
Commissioner of Patents